form

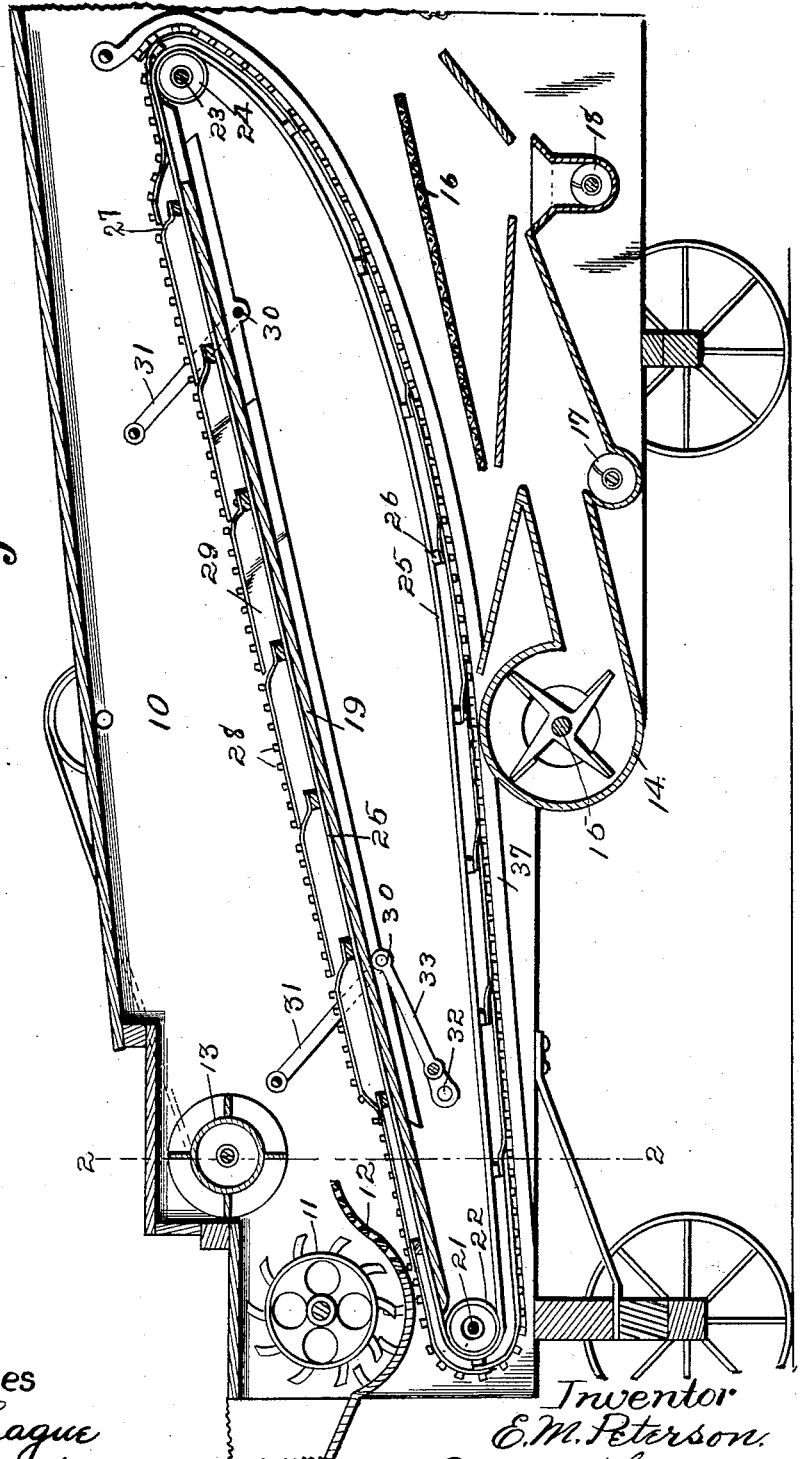

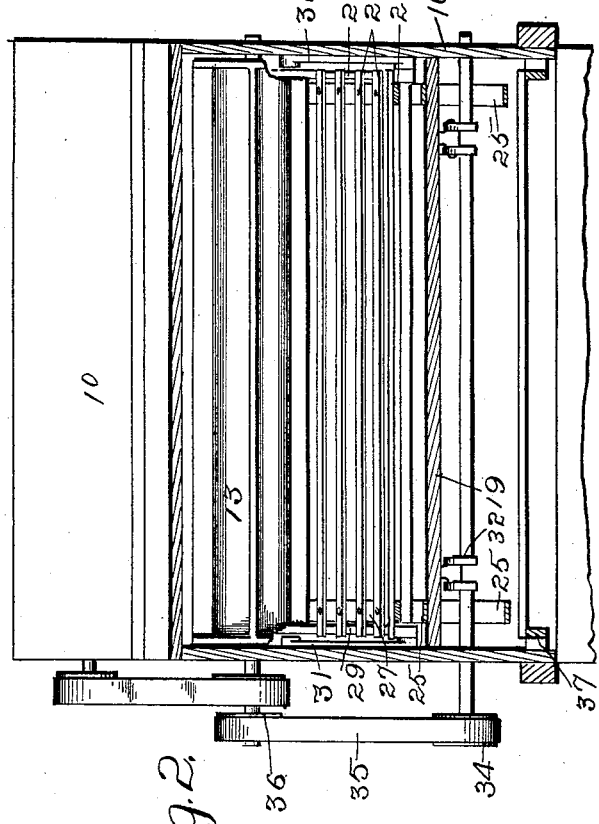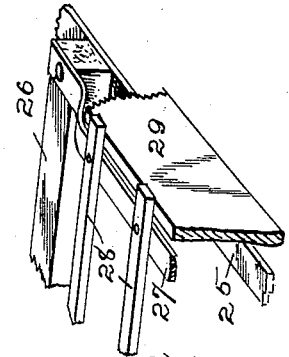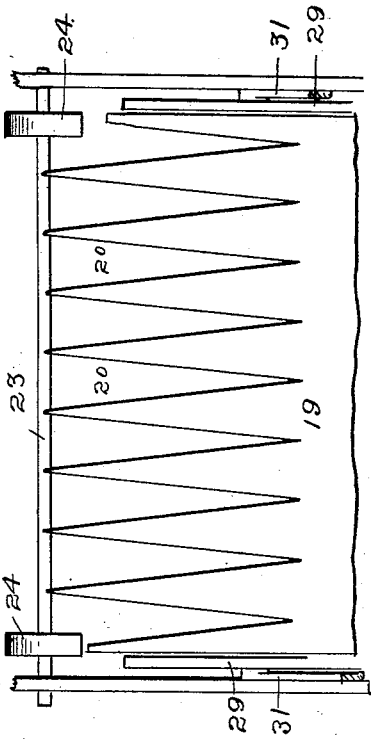

UNITED STATES PATENT OFFICE.

EDWARD M. PETERSON, OF FOREST CITY, IOWA.

THRESHING-MACHINE.

No. 912,610.  Specification of Letters Patent.  Patented Feb. 16, 1909.

Application filed April 15, 1908. Serial No. 427,279.

*To all whom it may concern:*

Be it known that I, EDWARD M. PETERSON, a citizen of the United States, residing at Forest City, in the county of Winnebago and State of Iowa, have invented a new and useful Threshing-Machine, of which the following is a specification.

The object of my invention is to provide means of simple, durable and inexpensive construction, whereby grain may be removed from the straw after passing between the threshing cylinder and concave, and further to provide means of this class which may be operated with a minimum of power, and which will not tend to shake the machine frame to any appreciable extent.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a central longitudinal sectional view of the threshing machine provided with my improvements. Fig. 2 shows a sectional view on the line 2—2 of Fig. 1 the beater, however, being shown in side elevation. Fig. 3 shows a detail plan view of the rear portion of the grain platform and adjacent parts, and Fig. 4 shows a detail perspective view of one of the guide rails with a portion of one of the slatted frames resting thereon.

Referring to the accompanying drawings, I have used the reference numeral 10 to indicate the threshing machine frame which is of the ordinary construction. Mounted within the frame is a threshing cylinder 11, a concave 12, a beater 13, a fan casing 14 containing a fan 15, a sieve 16, a chaff conveyer 17, and a grain conveyer 18, all of the ordinary construction.

Extending from a point below the concave in an upward and rearward direction, is a solid grain platform 19, the rear end of which is provided with a series of V-shaped notches 20, to permit grain to flow through before the chaff and straw passes beyond the end of the grain platform. This construction is clearly shown in Fig. 3. Below the front end of the grain platform is a shaft 21 having pulleys 22 thereon, only one of which is shown in Fig. 1, and below the rear of the grain platform is a shaft 23 having pulleys 24 thereon. Two belts 25 are passed around these pulleys, and are connected by means of the cross slats 26, which slats are spaced apart from each other and are designed to rest upon the top of the platform 19 when moving upwardly and rearwardly.

Connected with each of the slats 26 are two flexible straps 27 arranged at the ends of the slats 26, and of such length as to project over the adjacent slat. Fixed to each pair of flexible straps 27 is a series of small slats 28. These slats 28 have their ends projecting beyond the flexible straps 27 and are somewhat longer than the slats 26, as clearly shown in Fig. 4.

At each side of the grain platform is a guide rail 29 having its forward and rear ends curved, as shown in Fig. 1. The upper surface of each guide rail is capable of moving from position substantially flush with the top of the grain platform 19, to a point a considerable distance above it, and said guide rails are so arranged that when moved above the grain platform, they will engage the ends of the slats 28 and carry them up above the platform without affecting the cross slats 26. I have provided for imparting an oscillating motion to these guide rails as follows: Each pair of guide rails is connected by means of the rods 30 and two hangers 31 are provided for each end of the guide rails, which hangers are pivoted to the frame 10. The reference numeral 32 indicates a shaft extended across the machine frame and connected by means of a pitman 33 with the forward cross rod 30, as clearly shown in Fig. 1. Hence, upon a rotation of the shaft 32, the hangers 31 will be oscillated and the guide rails 27 will be moved up and down. I provide for rotating the shaft 32 by means of a pulley 34 on one end, connected by a belt 35 with the pulley 36 on the shaft of the beater 13.

Below the platform 19, I have fixed to the sides of the frame 10 two curved guides 37, so arranged as to substantially follow the curvature of the belt 25, and engage the ends of the slats 28 during their return movement, to thereby hold them in a position close to the belts.

In practical use, assuming that grain and straw that pass beyond the cylinder and concave, are discharged on top of the slats 28, this grain and straw will be carried rearwardly and upwardly by the conveyer over the platform 19. As soon as the slats 28 reach the forward ends of the guide rails 29, then they will be alternately raised and lowered by the movement of said guide rails. This will have the effect of throwing the straw up and down, and loosening it, and permitting the grain to pass through it upon the platform 19. The cross slats 26 resting on said platform will force the grain upwardly to the rear end of the platform 19, whereupon it may drop through the V-shaped grooves 20 upon the sieve 16, and the straw will pass over it and be discharged from the rear of the machine in the ordinary way. By this means, the straw will be violently shaken and thrown up, during each movement of the guide rails 29, and the grain that is removed from the straw will be kept separate from it until discharged at the rear end of the platform.

Having thus described my invention, what I claim and desire to secure by Letters Patent, is—

1. In a device of the class described, the combination of a conveyer, cross slats connected to the conveyer, and capable of movement toward and from the conveyer, guide rails designed to engage said slats, and means for moving the guide rails to alternately move the slats from the conveyer, and permit them to return toward it.

2. In a device of the class described, the combination of a flexible endless conveyer, cross slats fixed to the conveyer, flexible straps attached to said cross slats, a series of cross slats attached to the straps on each of the first mentioned cross slats, guide rails arranged on opposite sides of the conveyer and designed to engage the cross slats on the flexible straps, and means for moving said guide rails to elevate the cross slats on the straps from the conveyer.

3. In a device of the class described, the combination of a flexible endless conveyer, cross slats fixed to the conveyer, flexible straps attached to said cross slats, a series of cross slats attached to the straps on each of the first mentioned cross slats, guide rails arranged on opposite sides of the conveyer and designed to engage the cross slats on the flexible straps, and means for moving said guide rails to elevate the cross slats on the straps from the conveyer, and a platform below the upper portion of the endless conveyer and curved guides below the lower portion of the endless conveyer to engage and support the cross slats on the straps.

4. In a device of the class described, the combination of a machine frame, a platform extended upwardly and rearwardly in the machine frame, and having V-shaped notches at its rear end, a flexible endless conveyer arranged to move upwardly and rearwardly over the platform, and downwardly and forwardly below the platform, with its upper portion resting on the platform, a series of cross slats fixed to the endless conveyer, two flexible straps on the ends of each cross slat, a series of slats fixed to each pair of flexible straps and being somewhat longer than the cross slats on the conveyer, two guide rails at the sides of the platform designed to engage the slats on the flexible straps, means for connecting these guide rails, hangers pivoted to the frame to support the guide rails, a crank shaft, means for operating it, and a pitman connected to the crank shaft and to the guide rails for imparting oscillating motion to them, and guides fixed to the frame to receive the cross slats on the flexible straps, and support them substantially parallel with the endless conveyer below the platform.

Des Moines, Iowa, Feb. 19, 1908.

EDWARD M. PETERSON.

Witnesses:
H. T. PETERSON,
ALBERT SEVERSON.